(12) United States Patent
Ku

(10) Patent No.: US 6,449,391 B1
(45) Date of Patent: Sep. 10, 2002

(54) IMAGE SEGMENTATION METHOD WITH ENHANCED NOISE ELIMINATION FUNCTION

(75) Inventor: Jeong-Hoe Ku, Yongin-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/392,396

(22) Filed: Sep. 9, 1999

(30) Foreign Application Priority Data

Oct. 13, 1998 (KR) .......................... 1998-42804

(51) Int. Cl.[7] .......................... G06K 9/00; G06K 9/46; G06K 9/48; G06K 9/40; H04N 1/40
(52) U.S. Cl. .................. 382/194; 382/105; 382/199; 382/267; 358/462; 358/463
(58) Field of Search ................... 382/174, 176, 382/177, 178, 187, 190, 192, 193, 194, 205, 266, 267, 102, 104, 199, 200, 105; 358/462, 463

(56) References Cited

U.S. PATENT DOCUMENTS

| | | | | |
|---|---|---|---|---|
| 4,747,149 A | * | 5/1988 | Umeda et al. | 382/194 |
| 5,253,304 A | * | 10/1993 | LeCun et al. | 382/102 |
| 5,754,684 A | * | 5/1998 | Kim | 382/176 |
| 5,999,647 A | * | 12/1999 | Nakao et al. | 382/187 |
| 6,115,497 A | * | 9/2000 | Vaezi et al. | 382/174 |

* cited by examiner

*Primary Examiner*—Amelia M. Au
*Assistant Examiner*—Mehrdad Dastouri
(74) *Attorney, Agent, or Firm*—F. Chau & Associates, LLP

(57) ABSTRACT

Segmentation of a character-containing image, made by placing a dark mark against a light background, is accomplished by establishing a vertical pixel projection for each pixel column in the image. For more exact segmentation, the image is horizontally scanned in each row of the image after detecting edges of characters. The scanned results and thresholds are compared to verify whether edges and spaces of the scanned row are noise or discontinuous edges. The thresholds correlate with neighboring row data of the image. According to the results of the comparison, the discontinuous edges are connected and the noise is eliminated. Thereby, the character-containing image can be segmented into each character without segmentation errors.

14 Claims, 6 Drawing Sheets

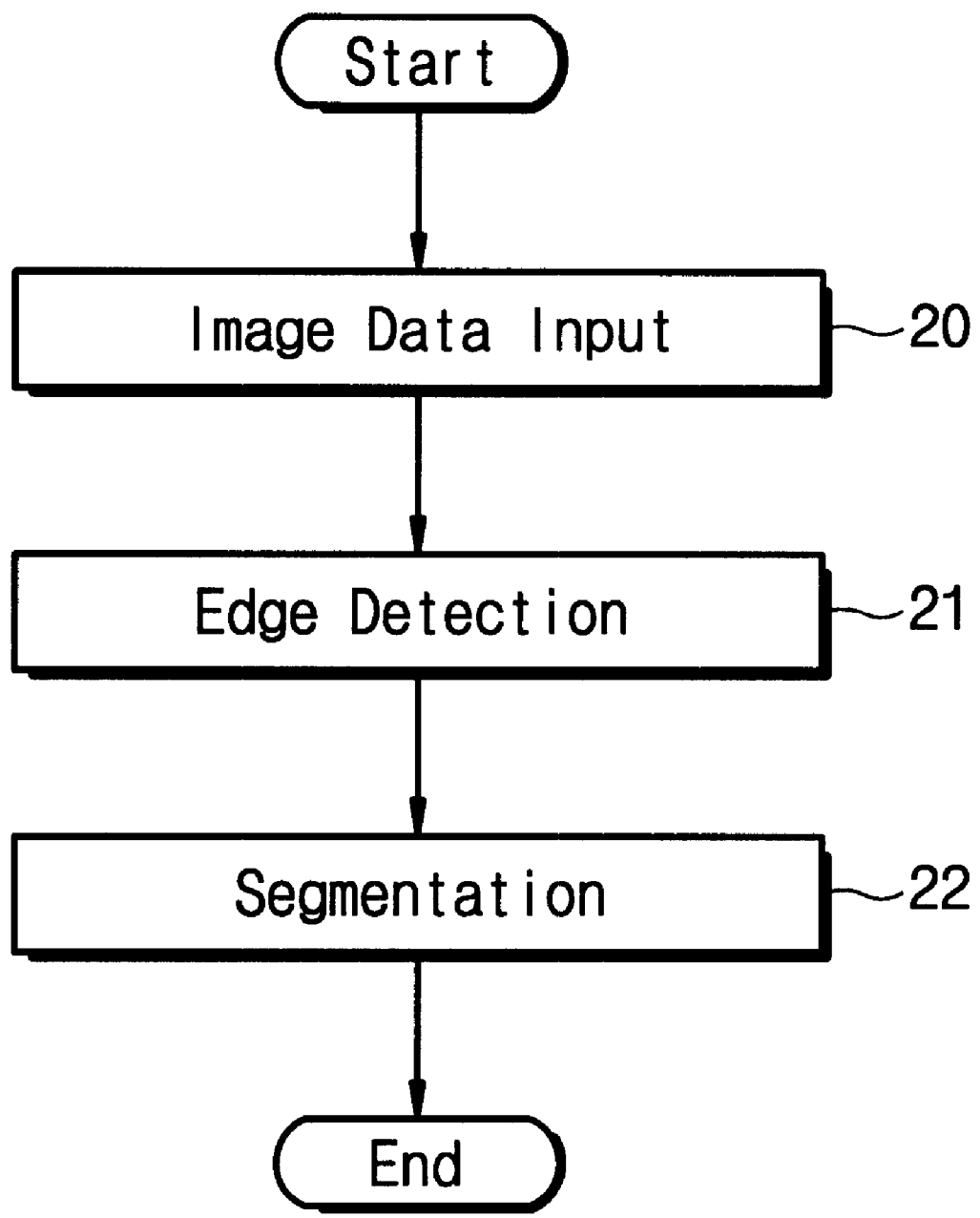

Fig. 5

IMAGE SEGMENTATION METHOD WITH ENHANCED NOISE ELIMINATION FUNCTION

FIELD OF THE INVENTION

The present invention relates to digital image pattern recognition and, more particularly, to a method for segmenting an image for an exact character recognition.

BACKGROUND OF THE INVENTION

Pattern recognition has been used for many industrial applications. Many statistical and syntactical techniques have been developed for the classification of patterns. Techniques from pattern recognition play an important role in machine vision for recognizing objects.

Numerical data and symbolic data can be recognized by a computer-based machine through the pattern recognition. The machine vision is adapted for recognizing images.

Generally, an image may contain several objects and, in turn, each object may contain several regions corresponding to different parts of the object. For correct interpretation of an object, the object should be partitioned into multiple regions, each region corresponding to a divided part of the object.

In particular, an image containing characters, such as an automobile licence plate image, can be represented as a plurality of picture elements (hereinafter, "pixels"), each of which has a particular intensity throughout. Characters of a licence plate image are typically established by painting the characters against a light or dark colored background, so that the pixels containing character information have lower or higher intensity than those containing only background information.

In pattern recognition, all pixels are grouped in accordance with their corresponding regions. The respective grouped pixels are marked to indicate that they belong to a certain region. This process is called segmentation.

FIG. 1A illustrates an image of an automobile licence plate captured by a camera of a machine vision system used for recognizing objects. The image contains noise components 11 and 12. FIG. 1B illustrates a vertical projection result of a binary image of the automobile licence plate shown in FIG. 1A before performing an edge detection.

Referring to FIG. 1A, the machine vision system serves to digitize the captured image, i.e., to transform the analog signal provided from the camera into a plurality of digital words each representing the intensity of a pixel of the captured image. The most commonly represented image intensities have 256 different gray levels.

Generally, the machine vision systems use a binary image rather than an image represented with gray levels for segmentation. Because the binary image contains only two gray levels, the machine vision systems using the binary image tend to be less expensive and faster than vision systems that operate on gray level or color images.

Thus, prior to the vertical and/or horizontal projection process, the image represented with gray levels shown in FIG. 1A is converted into the binary image. A method for making the binary image is disclosed in "THE POCKET HANDBOOK OF IMAGE PROCESSING ALGORITHM IN C" by Harley R. Myler et al., Prentice Hall, pp. 239–240, published in 1995, and "MACHINE VISION" by Ramesh Jain et al., McGraw-Hill, Inc., pp. 25–31, published in 1995.

Generally, an image data is often corrupted by random variations in intensity values so as to become noises (referring to the region 11 and 12 of FIG. 1A). Some common types of noises 1 1 and 12 are salt and pepper noises, impulse noises, and Gaussian noises.

Regarding the licence plate image of FIG. 1A, the background image 13 may correspond to white pixels (for example, logic "0"s), while character image 10 correspond to black pixels (for example, logic "1"s), in its binary image. In addition, noise components 11 and 12 contained in the binary image may also correspond to black pixels ("1"s). For this reason, the pixels of noises 11 and 12 will be counted as the black pixels ("1"s) together with the pixels of the respective characters 10 during the vertical projection process. In other words, the noise components are considered as the character components. If the count value of any region is greater than a predetermined threshold Th, the region is classified as a character region. Accordingly, greatly erroneous segmentation will result from the noises 11 and 12 (see the regions 14 and 15 of FIG. 1B). An example of image segmentation is disclosed in U.S. Pat. No. 5,253,304, issued to Yann A. LeCun et al.

Segmentation of an image can also be achieved by finding pixels that lie at boundaries of the regions. These pixels, called edges, can be found by looking at neighboring pixels. Most edge detectors may utilize intensity characteristics as the basis for edge detection. Such a method using the edge detection is illustrated in FIG. 2.

Referring to FIG. 2, the segmentation begins at step 20 by receiving a grey-level image data. In step 21, edge detection of image data is performed. Edges typically exist on the boundary between two different regions in an image. Detailed edge detecting techniques are disclosed in, for example, "MACHINE VISION" by Ramesh Jain et al., McGraw-Hill, Inc., pp. 140–181, published in 1995. At step 22, the image is segmented through horizontal projection and/or vertical projection with thresholds.

FIG. 3A illustrates detected edges of the automobile licence plate image of FIG. 1A, and FIG. 3B is a diagram illustrating a vertical projection result of the image of FIG. 3A. Referring to FIG. 3A, the edges are obtained by an edge detector, for example, Sobel operator, Prewitt operator, Laplacian operator, or Laplacian of gGaussian operator. The image of FIG. 3A has less noise than does the binary image of FIG. 1A. As shown in FIG. 3B, however, the erroneous segmentation (referring to the regions 34 and 35 of FIG. 3B) still remains because of the remaining noise components 31 and 32.

SUMMARY OF THE INVENTION

It is an object of the present invention to provide a method for segmenting an image to obtain more accurate recognition of characters in the image.

In order to attain the above object as well as other objects, there is provided a method for segmenting an image formed of a plurality of pixels, comprising the steps of detecting edges of the image, scanning rows of the image to discriminate between real edges and noises, eliminating the noises of the image, projecting the image, and segmenting the image.

BRIEF DESCRIPTION OF THE DRAWINGS

FIG. 2 is a flowchart illustrating a conventional method for segmenting image data for pattern recognition;

FIG. 5 is an enlarged view of a portion of the image shown in FIG. 3A;

DESCRIPTION OF PREFERRED EMBODIMENTS

The present invention relates to an improvement in image segmentation for pattern recognition. In the following description, specific details are set forth to provide a thorough understanding of the present invention. However, one skilled in the art appreciates that the present invention may be practiced without such particulars.

Figure 4:
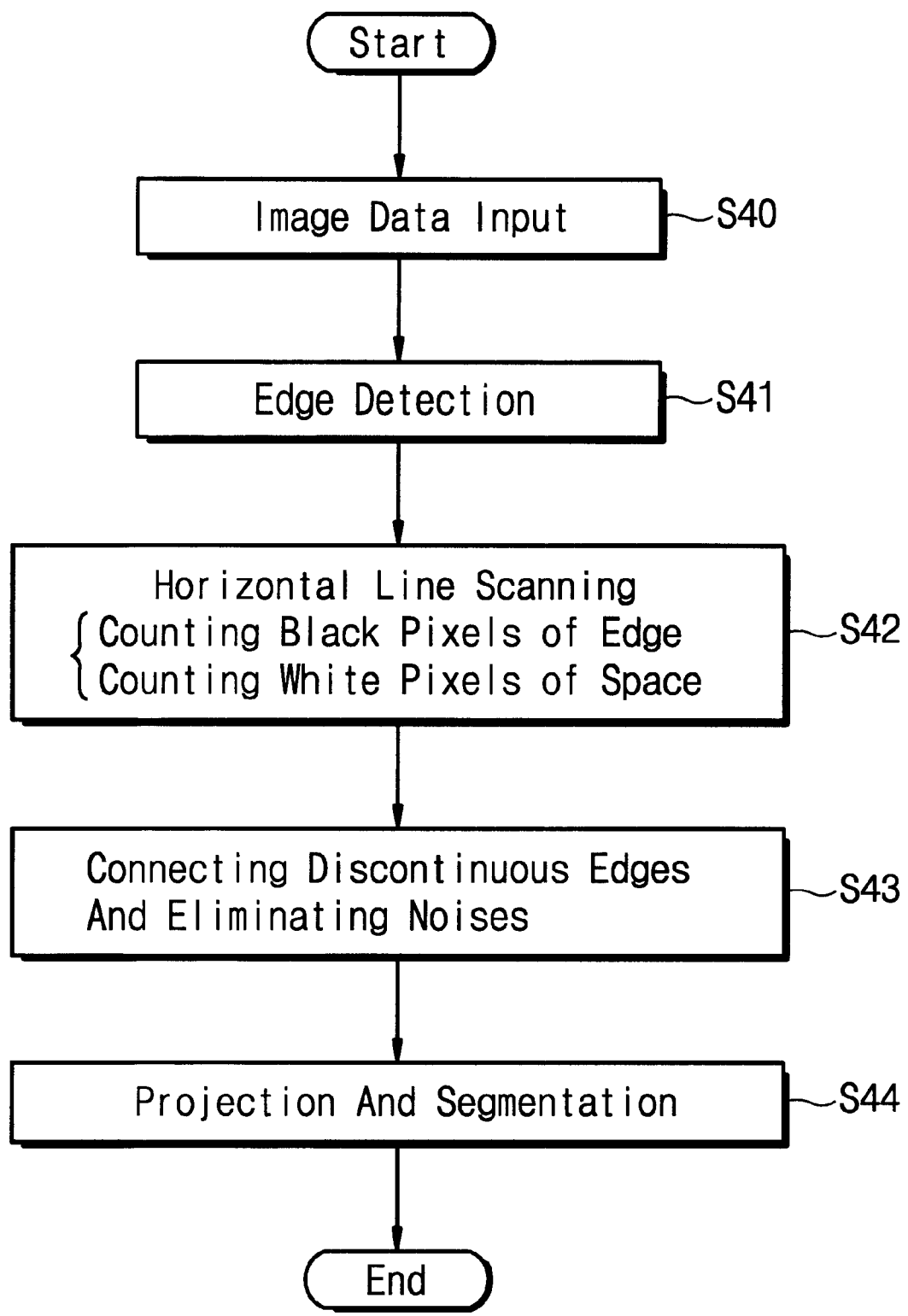
FIG. 4 is a flowchart illustrating a method for segmenting image data for pattern recognition according to the present invention.

FIG. 4 is a flowchart illustrating a segmentation method for pattern recognition according to an embodiment of the present invention.

At step S40, an image, for example, a license plate of an automobile, is input to a pattern recognition system. Since the license plate image contains noises, the pattern recognition system is unable to use it directly.

In step S41, the pattern recognition system removes parts of the noises by, for example, low pass filtering, and detects edges of the image. Even after the noise filtering, some noises remain in the image as shown in FIG. 3A.

Figure 1A:
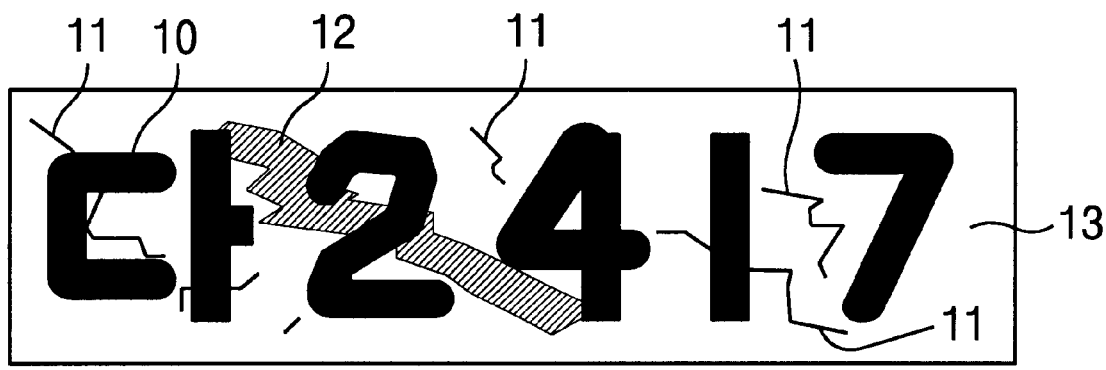
FIG. 1A illustrates an image of an automobile licence plate captured by a camera of a machine vision system for recognizing objects.
Figure 1B:
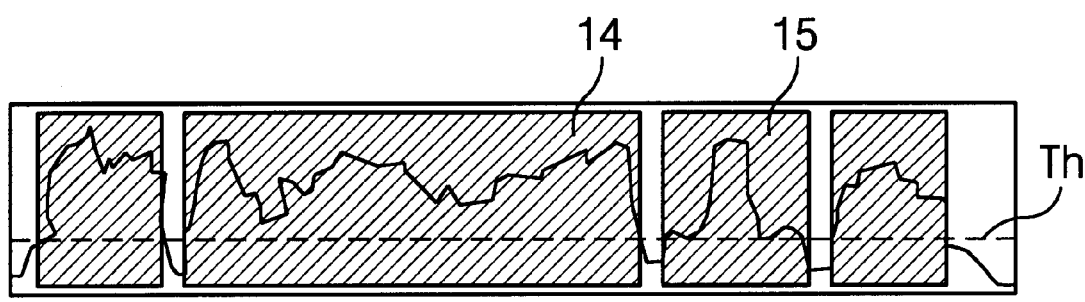
FIG. 1B is a diagram illustrating a vertical projection result of a binary image of the automobile licence plate shown in FIG. 1A without an edge detection.
Figure 3A:
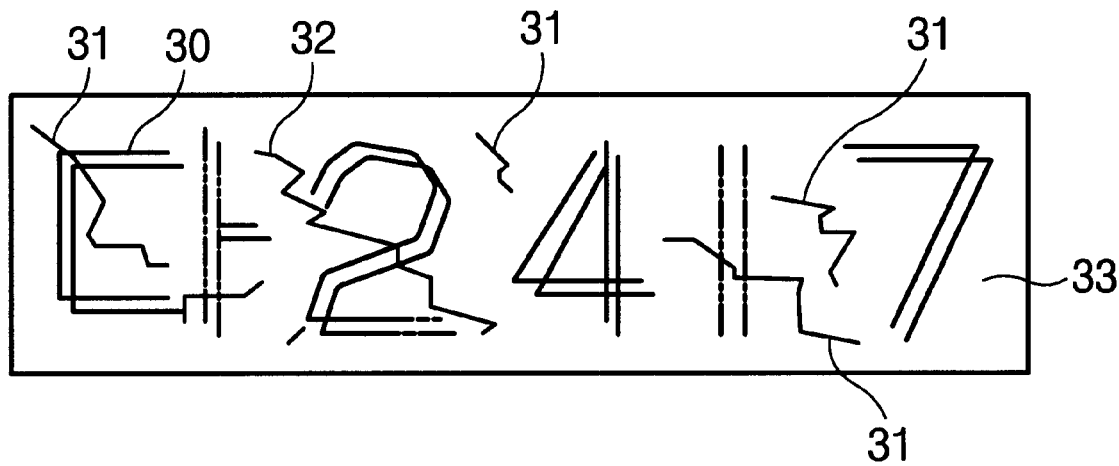
FIG. 3A illustrates an image of detected edges of the automobile licence plate image of FIG. 1A.
Figure 3B:
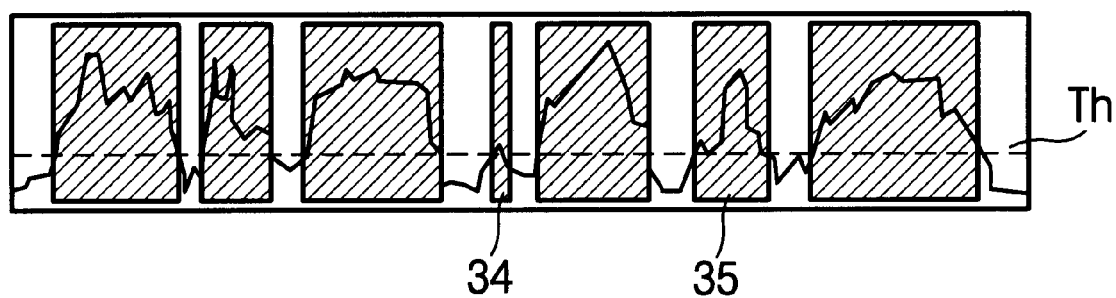
FIG. 3B is a diagram illustrating a vertical projection result of the image of FIG. 3A according to the conventional method of FIG. 2.
Figure 5:
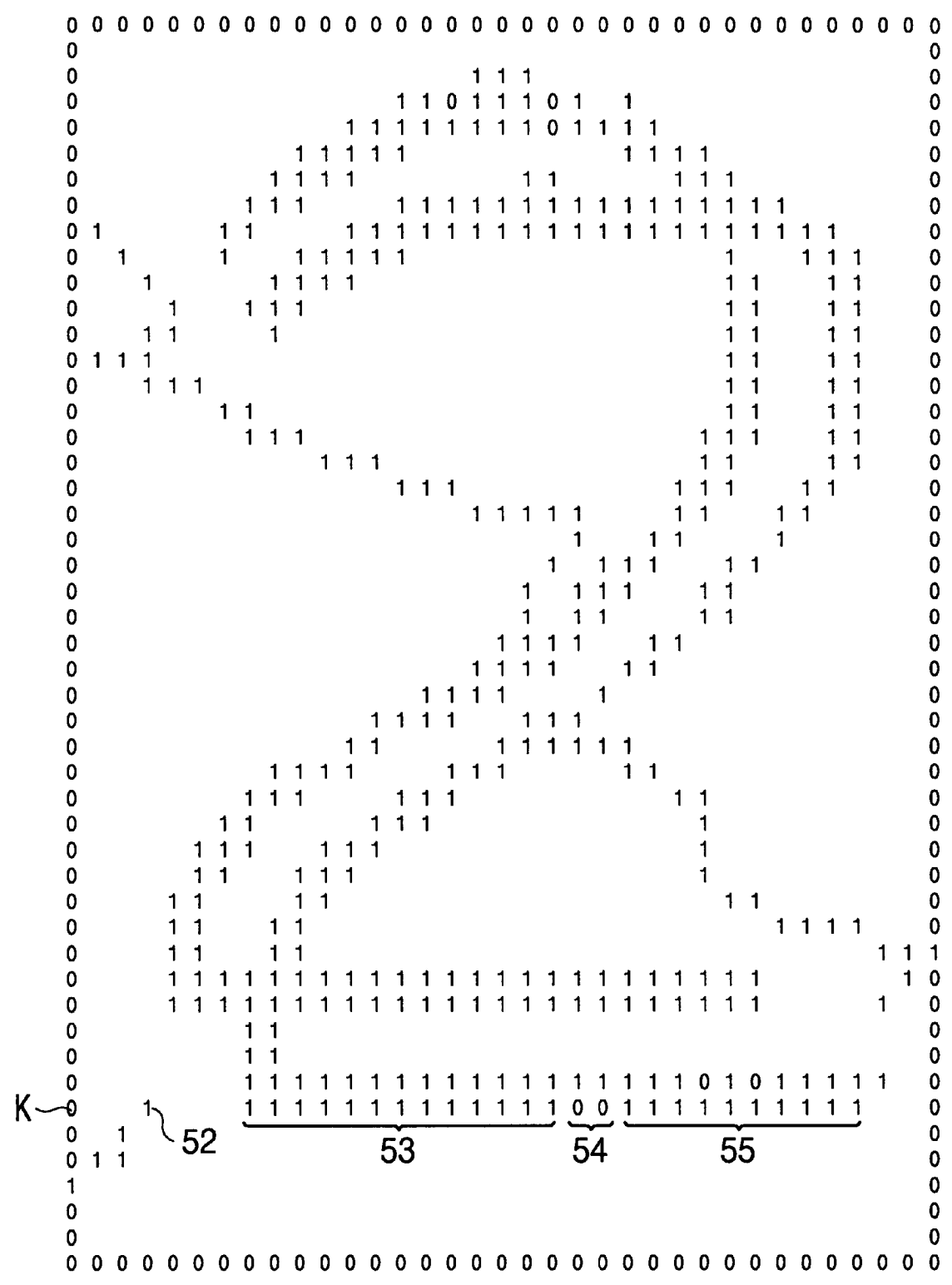

FIG. 5 is an enlarged view of a portion of the image shown in FIG. 3A. Referring to FIG. 5, the background of a license plate corresponds to white pixels (for example, logic "0"s), and the edges of each character correspond to black pixels (for example, logic "1"s).

The noises contained in the image also correspond to black pixels ("1"s). These noises cause segmentation errors, thereby regions and objects will not be accurately segmented.

To remove the remaining noises and connect the discontinuous edges, in step S42 the pattern recognition system horizontally scans each row of the image and counts pixels corresponding to an ith edge for generating a first value N and an ith space for generating a second value $D_{h,i}^{(n)}$, respectively.

The first value $N_{h,i}^{(n)}$ is defined as follows.

$$N_{h,i}^{(n)} = \sum_{m=c(2i)}^{c(2i+1)-1} b(m) \left(0 \leq n \leq N-1, 0 \leq i \leq \left(\frac{M}{2}-1\right)\right) \quad (1)$$

Where, $N_{h,i}^{(n)}$ is equal to a summation of the pixels corresponding to the ith edge of the nth row of the image, and the size of the image is an N×M array with binary levels. A value of b(m) is equal to a pixel value of the mth pixel of the ith edge, that is, either binary number "0" or "1".

A second value $D_{h,i}^{(n)}$ is defined as follows.

$$D_{h,i}^{(n)} = |m_{c(2i+1)}^{(n)} - m_{c(2i)}^{(n)}| \quad (2)$$

Where, $D_{h,i}^{(n)}$ is equal to the number of the white pixels ("0"s) comprised in the ith space of the nth row of the image. In other words, the second value $D_{h,i}^{(n)}$ is a length of the space between the ith edge and the next edge. $m_{c(2i)}^{(n)}$ is an ending point of the ith edge and $m_{c(2i+1)}$ is a starting point of the next edge.

From equations (1) and (2), equation (3) can be obtained.

$$M = \sum_i (N_{h,i}^{(n)} + D_{h,i}^{(n)}) \quad (3)$$

As shown in the equation (3), the totality of each edges and spaces is equal to the horizontal size M of the image.

In step S43, the pattern recognition system compares the first value $N_{h,i}^{(n)}$ with a first threshold of the prior row $K^{(n-1)}$ and compares the second value $D_{h,i}^{(n)}$ with a second threshold of the prior row $L^{(n-1)}$ for verifying whether the pixels of the ith space are the discontinuous edges of the character, or whether the pixels of the ith edge are the noises.

Each row of the image has the first and the second thresholds $K^{(n)}$ and $L^{(n)}$. The thresholds $K^{(n)}$ and $L^{(n)}$ are used for the next row, and the thresholds of prior row $K^{(n-1)}$ and $L^{(n-1)}$ are used for the present row.

The thresholds $K^{(n)}$ and $L^{(n)}$ correlate with neighboring rows. Thus, the thresholds refer to average of each length of the edge/space and the thresholds of the prior row. The thresholds $K^{(n)}$ and $L^{(n)}$ are determined as follows.

$$K^{(n)} = \alpha K^{(n-1)} + (1-\alpha) \cdot avg[N_{h,i}^{(n-1)}] \quad (4)$$

$$L^{(n)} = (1-\alpha) \cdot L^{(n-1)} + \alpha \cdot avg[D_{h,i}^{(n-1)}] \quad (5)$$

Where, the "a" is an experimentally determined weight between 0.0 and 1.0 for optimum thresholds.

In step S43, as described above, the pattern recognition system uses the thresholds of prior row $K^{(n-1)}$ and $L^{(n-1)}$ to determine whether connecting the discontinuous edges, or eliminating the noises. If the first value $N_{h,i}^{(n)}$ is greater than the first threshold of the prior row $K^{(n-1)}$ and the second value $D_{h,i}^{(n)}$ is less than the second threshold of the prior row $L^{(n-1)}$, the ith space is verified to the discontinuous edge, so that the space contained "0" is filled with "1". On the contrary, if the first value $N_{h,i}^{(n)}$ is less than the first threshold of the prior row $K^{(n-1)}$ and the second value $D_{h,i}^{(n)}$ is greater than the second threshold of the prior row $L^{(n-1)}$, the ith edge is verified to the space, so that the edge contained "1" is filled with "0". Referring to FIG. 5, the image has the isolated edge 52 and the space 54 in its kth row. According to equations (1) to (5), the edge 52 is so much isolated from the environment that the edge contained "1" is filled with "0". Thus, the noise 52 is eliminated. The space 54 is composed of only two pixels, and the neighboring edges are composed of a plurality of pixels, so that the space contained "0" is filled with "1". Thus, the discontinuous edge 54 can be connected.

After removing the noises and connecting the discontinuous edges, the recognition system, at step S44, vertically projects the image and segments each character with a threshold for segmentation. The segmentation errors will be reduced in step S44, since the edges are more enhanced and the noises are eliminated in step S43.

Figure 6A:
FIG. 6A is an image illustrating enhanced edges and eliminated noises after applying the method according to the present invention.
Figure 6B:
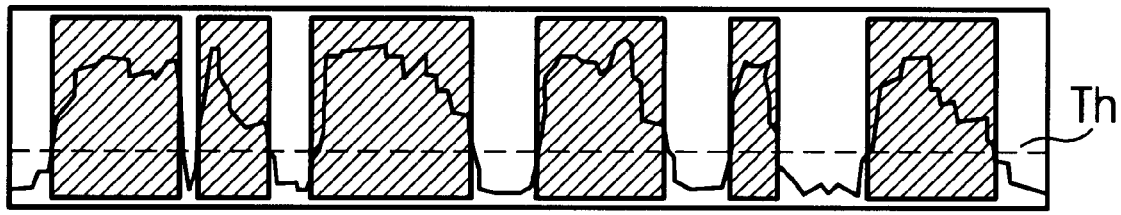
FIG. 6B is a diagram illustrating a vertical projection result of the image shown in FIG. 6A according to the present invention.

FIG. 6A is an image illustrating enhanced edges and eliminated noises after applying the method according to the present invention, and FIG. 6B is a diagram illustrating a vertical projection result of the image shown in FIG. 6A.

As shown in FIGS. 6A and 6B, the edges and the noises are substantially enhanced and eliminated, respectively. Thus, as shown in FIG. 6B, the vertically projected image can be segmented more exactly, since the influence of the noises is reduced.

While the invention has been described in terms of exemplary embodiments, it is contemplated that it may be practiced as outlined above with modifications within the spirit and scope of the appended claims.

What is claimed is:

1. A method for segmenting an image formed of a plurality of pixels, comprising the steps of:
    detecting edges of the image, the edge-detected image including real edges and noise;
    scanning rows of the image to discriminate between the real edges and the noise,
    eliminating the noise of the image;
    projecting the image; and
    segmenting the image,
    wherein the scanning step includes the steps of:
        discriminating between real spaces and discontinuous edges;
        connecting the discontinuous edges between two adjacent edges;
        generating a first value by counting pixels corresponding to the real edges and the noise;
        generating a second value by counting pixels corresponding to the real spaces and the discontinuous edges; and
        comparing the first value and the second value with predetermined first threshold and second threshold, respectively, to verify the counted pixels according to the results of the comparison.

2. The method of claim 1, wherein the first and second thresholds limit ranges of the first and the second values, respectively, and correlate with neighboring data of the image.

3. The method of claim 1, wherein the verifying step includes verifying the counted pixels to the noise of the image when the first value is less than the first threshold and the second value is greater than the second threshold.

4. The method of claim 1, wherein the verifying step includes verifying the counted pixels to the discontinuous edges of the image when the first value is greater than the first threshold and the second value is less than the second threshold.

5. The method of claim 1, wherein the first threshold depends on a threshold of a previous row and an average number of pixels verified to edges in the previous row.

6. The method of claim 1, wherein the second threshold depends on a threshold of a previous row and an average number of pixels verified to spaces in the previous row.

7. The method of claim 1, wherein the first value is equal to a summation of pixels corresponding to edges of a row of an image.

8. The method of claim 1, wherein the second value is equal to a summation of pixels corresponding to spaces of a row of an image.

9. The method of claim 4, further including a step includes the step of connecting the discontinuous edges.

10. A method for segmenting an image formed of a plurality of pixels, comprising the steps of:
    detecting edges and noise of each row of the image;
    discriminating between the edges and the noise detected;
    detecting spaces and discontinuous edges of each row of the image;
    discriminating between the spaces and the discontinuous edges detected;
    eliminating the noise discriminated from the edges;
    connecting the discontinuous edges discriminated from the spaces;
    projecting the image; and
    segmenting the image,
    wherein the step of discriminating includes the steps of:
        generating a first value by counting pixels corresponding to the edges;
        generating a second value by counting pixels corresponding to the spaces;
        comparing the first value and the second value with predetermined first threshold and second threshold generated by summing up a threshold of a previous row, and an average number of pixels verified to edges and spaces in the previous row, respectively, to verify the counted pixels according to the results of the comparison.

11. The method of claim 10, wherein the step of comparing the first value and the second value is verified when the first value is greater than the first threshold and the second value is less than the second threshold.

12. The method of claim 10, wherein the step of discriminating between the spaces and the discontinuous edges detected includes verifying the counted pixels to the spaces when the first value is less than the first threshold and the second value is greater than the second threshold.

13. The method of claim 10 wherein the step of eliminating the noise includes replacing values of the noise with values of the spaces of the image.

14. The method of claim 10, wherein the step of connecting the discontinuous edges includes replacing values of the discontinuous edges with values of the edges of the image.

* * * * *